US010027147B2

(12) United States Patent
Islinger et al.

(10) Patent No.: US 10,027,147 B2
(45) Date of Patent: Jul. 17, 2018

(54) METHODS AND APPARATUS FOR A MODULAR COIL HOLDER FOR AN EXTENDED WIRELESS CHARGING ROADWAY ASSEMBLY

(71) Applicant: QUALCOMM Incorporated, San Diego, CA (US)

(72) Inventors: Simon Peter Islinger, Munich (DE); Steven Daniel Niederhauser, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 15/002,204

(22) Filed: Jan. 20, 2016

(65) Prior Publication Data

US 2016/0218534 A1    Jul. 28, 2016

Related U.S. Application Data

(60) Provisional application No. 62/107,002, filed on Jan. 23, 2015.

(51) Int. Cl.
*H01F 38/14* (2006.01)
*H02J 50/10* (2016.01)
(Continued)

(52) U.S. Cl.
CPC ........... *H02J 7/0042* (2013.01); *B60L 11/182* (2013.01); *B60L 11/1829* (2013.01);
(Continued)

(58) Field of Classification Search
CPC .. B60L 11/00; B60L 11/1829; B60L 11/1838; B60M 7/00; B60M 7/003;
(Continued)

(56) References Cited

U.S. PATENT DOCUMENTS

| 4,665,329 A | 5/1987 | Raschbichler |
| 2008/0116847 A1 | 5/2008 | Loke et al. |

(Continued)

FOREIGN PATENT DOCUMENTS

| DE | 102008048822 A1 | 4/2010 |
| GB | 2505516 A | 3/2014 |

OTHER PUBLICATIONS

International Search Report and Written Opinion—PCT/US2016/014315—ISA/EPO—dated Mar. 22, 2016.

*Primary Examiner* — Lincoln Donovan
*Assistant Examiner* — David Mattison
(74) *Attorney, Agent, or Firm* — Knobbe, Martens, Olson & Bear, LLP

(57) ABSTRACT

A holder configured to hold one or more components of a wireless charging power transfer system is provided. The apparatus comprises a first surface having one or more grooves configured to receive at least a portion of a conductor of a coil that spans the holder and at least one other holder, the coil configured to inductively transfer power via a magnetic field. The apparatus comprises one or more mechanical connectors configured to fasten the holder to the at least one other holder. The apparatus further comprises a plurality of transverse grooves on the first surface that extend in a direction substantially perpendicular to a direction of extension of the one or more grooves, the plurality of transverse grooves configured to guide the conductor of the coil from the holder to the at least one other holder.

27 Claims, 7 Drawing Sheets

(51) Int. Cl.
*H02J 50/40* (2016.01)
*H01F 41/06* (2016.01)
*H01F 27/28* (2006.01)
*H02J 7/00* (2006.01)
*B60L 11/18* (2006.01)
*H02J 5/00* (2016.01)
*H02J 7/02* (2016.01)
*B60M 7/00* (2006.01)

(52) U.S. Cl.
CPC .......... *B60L 11/1838* (2013.01); *B60M 7/003* (2013.01); *H01F 27/28* (2013.01); *H01F 38/14* (2013.01); *H01F 41/06* (2013.01); *H02J 5/005* (2013.01); *H02J 7/025* (2013.01); *H02J 50/10* (2016.02); *H02J 50/40* (2016.02); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC .......... H01F 27/00; H01F 27/28; H01F 38/00; H01F 38/14; H01F 41/00; H01F 41/06; H02J 50/00; H02J 50/10; H02J 7/00; H02J 7/0042; H02J 17/00; H02J 5/00; H02J 5/005; H02J 50/40; H02J 7/025; Y02T 10/00; Y02T 10/7005; Y02T 90/00; Y02T 90/121; Y02T 90/122; Y02T 90/125; Y02T 90/128; Y02T 90/14; Y02T 90/163
USPC ....................................................... 307/104
See application file for complete search history.

(56) References Cited

U.S. PATENT DOCUMENTS

| | | |
|---|---|---|
| 2011/0074349 A1 | 3/2011 | Ghovanloo |
| 2013/0069444 A1 | 3/2013 | Waffenschmidt et al. |
| 2013/0233663 A1* | 9/2013 | Czainski ................ B60L 5/005 191/10 |
| 2014/0327391 A1 | 11/2014 | Niederhauser et al. |
| 2014/0368163 A1 | 12/2014 | Ho |
| 2017/0207656 A1* | 7/2017 | Boys ........................ H02J 50/10 |

* cited by examiner

METHODS AND APPARATUS FOR A MODULAR COIL HOLDER FOR AN EXTENDED WIRELESS CHARGING ROADWAY ASSEMBLY

CLAIM OF PRIORITY UNDER 35 U.S.C. § 119

The present application for patent claims priority to Provisional Application No. 62/107,002 entitled "METHODS AND APPARATUS FOR A MODULAR COIL HOLDER FOR AN EXTENDED WIRELESS CHARGING ROADWAY ASSEMBLY" filed Jan. 23, 2015, and assigned to the assignee hereof. Provisional Application No. 62/107,002 is hereby expressly incorporated by reference herein.

FIELD

This application is generally related to wireless power charging of chargeable devices such as electric vehicles and more specifically to methods and apparatus for a modular coil holder for an extended wireless charging roadway assembly.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions.

Extended wireless charging systems in roadway assemblies may be difficult to implement since reliable operation may depend at least in part on reliable, repeatable dimensioning of select portions of the roadway assembly. Accordingly, methods and apparatuses for modular coil holders for extended wireless charging roadway assemblies may be desirable.

SUMMARY

According to some implementations, a holder configured to hold one or more components of a wireless charging power transfer system is provided. The holder comprises a first surface having one or more grooves configured to receive at least a portion of a conductor of a coil that spans the holder and at least one other holder, the coil configured to inductively transfer power via a magnetic field. The holder further comprises one or more mechanical connectors configured to fasten the holder to the at least one other holder.

In some other implementations, a holder configured to hold one or more components of a wireless charging power transfer system is provided. The holder comprises a first surface having one or more grooves configured to receive at least a portion of a conductor of a coil, the coil configured to inductively transfer power via a magnetic field. The holder further comprises one or more mechanical connectors configured to fasten the holder to at least one other holder, wherein the holder is further configured to support one or more components for transferring power from a power supply to the coil.

In some other implementations, a method for installing a wireless charging power transfer system is provided. The method comprises fastening a plurality of holders to one another via one or more mechanical connectors on each of the holders, each of the plurality of holders further comprising a first surface having one or more grooves configured to receive at least a portion of a conductor of a coil. The method further comprises winding a conductor of a coil into the one or more grooves of at least two of the holders such that the coil spans the at least two holders.

In yet other implementations a holder configured to hold one or more components of a wireless charging power transfer system is provided. The holder comprises means for receiving at least a portion of a conductor of a coil on a first surface of the holder, the coil configured to span the holder and at least one other holder and inductively transfer power via a magnetic field. The holder further comprises means for mechanically fastening the holder to the at least one other holder.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
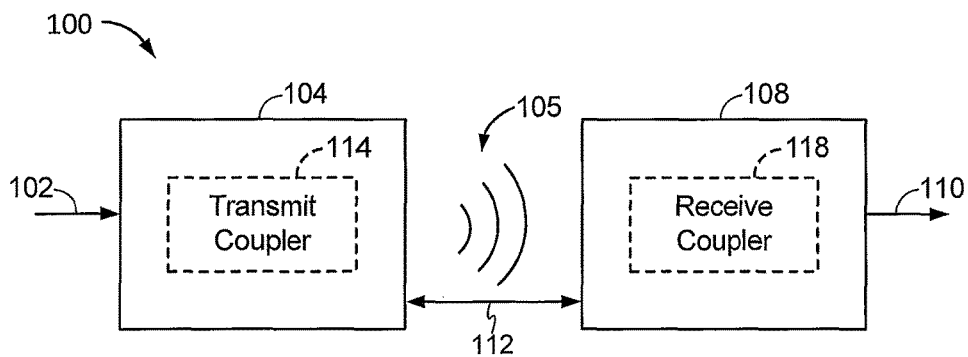
FIG. 1 is a functional block diagram of a wireless charging power transfer system, in accordance with some implementations.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless charging power transfer system 100, in accordance with an implementation. An input power 102 may be provided to a transmitter 104 from a power source (not shown) to generate a time varying wireless (e.g., magnetic or electromagnetic) field 105 with a frequency corresponding to the resonant frequency of the transmit coupler 114 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space.

As such, wireless power transfer may be provided over a larger distance in contrast to purely inductive solutions that may require large couplers which are very close (e.g., within millimeters). Resonant inductive coupling techniques may thus allow for improved efficiency and power transfer over various distances and with a variety of inductive coupler configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit coupler 114 for coupling energy to the receiver 108. The receiver 108 may include a receive coupler 118 for receiving or capturing energy transmitted from the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

As described above, efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118. The area around the transmit coupler 114 and the receive coupler 118 where this coupling may occur is referred to herein as a coupling-mode region.

Figure 2:
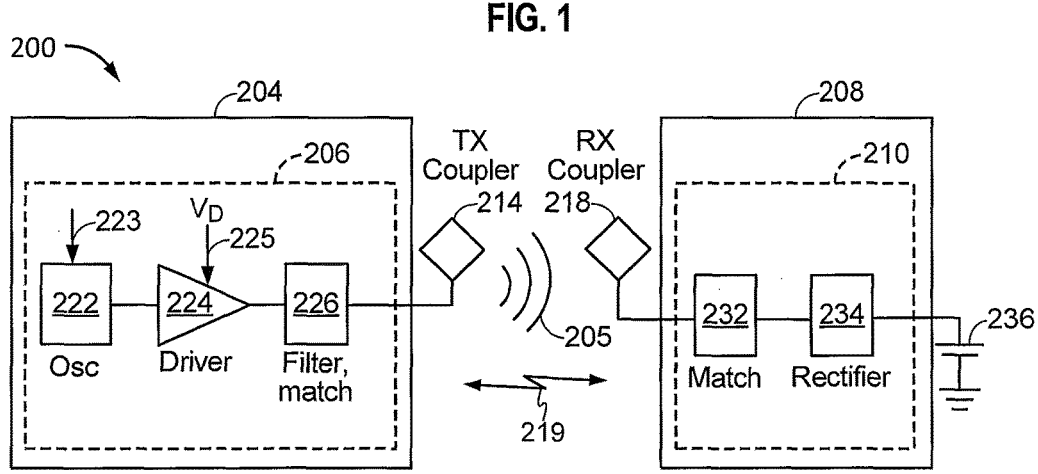
FIG. 2 is a functional block diagram of a wireless charging power transfer system, in accordance with some implementations.

FIG. 2 is a functional block diagram of a wireless charging power transfer system 200, in accordance with another implementation. The system 200 may be a wireless charging power transfer system of similar operation and functionality as the system 100 of FIG. 1. However, the system 200 provides additional details regarding the components of the wireless charging power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the transmit coupler 214. As a result of driving the transmit coupler 214, the transmit coupler 214 may generate a wireless field 205 to wirelessly output power at a level sufficient for charging a battery 236 of the electric vehicle 605, for example.

The receiver 208 may include a receive circuitry 210 that may include a matching circuit 232 and a rectifier circuit 234. The matching circuit 232 may match the impedance of the receive circuitry 210 to the receive coupler 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
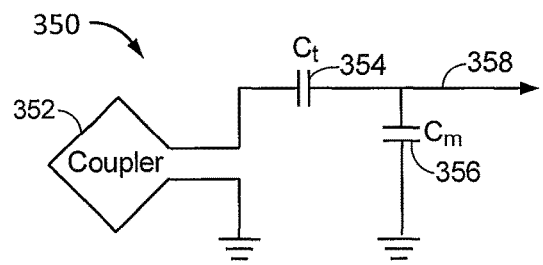
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some implementations. As illustrated in FIG. 3, a transmit or receive circuitry 350 may include a coupler 352. The coupler 352 may also be referred to or be configured as a "conductor loop" or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added to the coupler's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger sized couplers using large diameter coils exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 358, with a frequency that substantially corresponds to the resonant frequency of the coupler 352, may be an input to the coupler 352.

Many current wireless vehicle charging systems require the electric vehicle being charged to be stationary, i.e., stopped near or above the base coupler such that the electric vehicle maintains presence within the wireless field generated by the base coupler. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

For example, the electric vehicle may travel along a roadway having a dynamic wireless charging system. The dynamic wireless charging system may comprise a plurality of the base couplers placed linearly along a path of travel. The electric vehicle may request the dynamic wireless charging system activate the base couplers along the electric vehicle's path of travel. Such dynamic charging may also serve to reduce or eliminate the need for auxiliary or supplemental motor systems in addition to the electric locomotion system of the electric vehicle (e.g., a secondary gasoline engine of the hybrid/electric vehicle).

Figure 4:
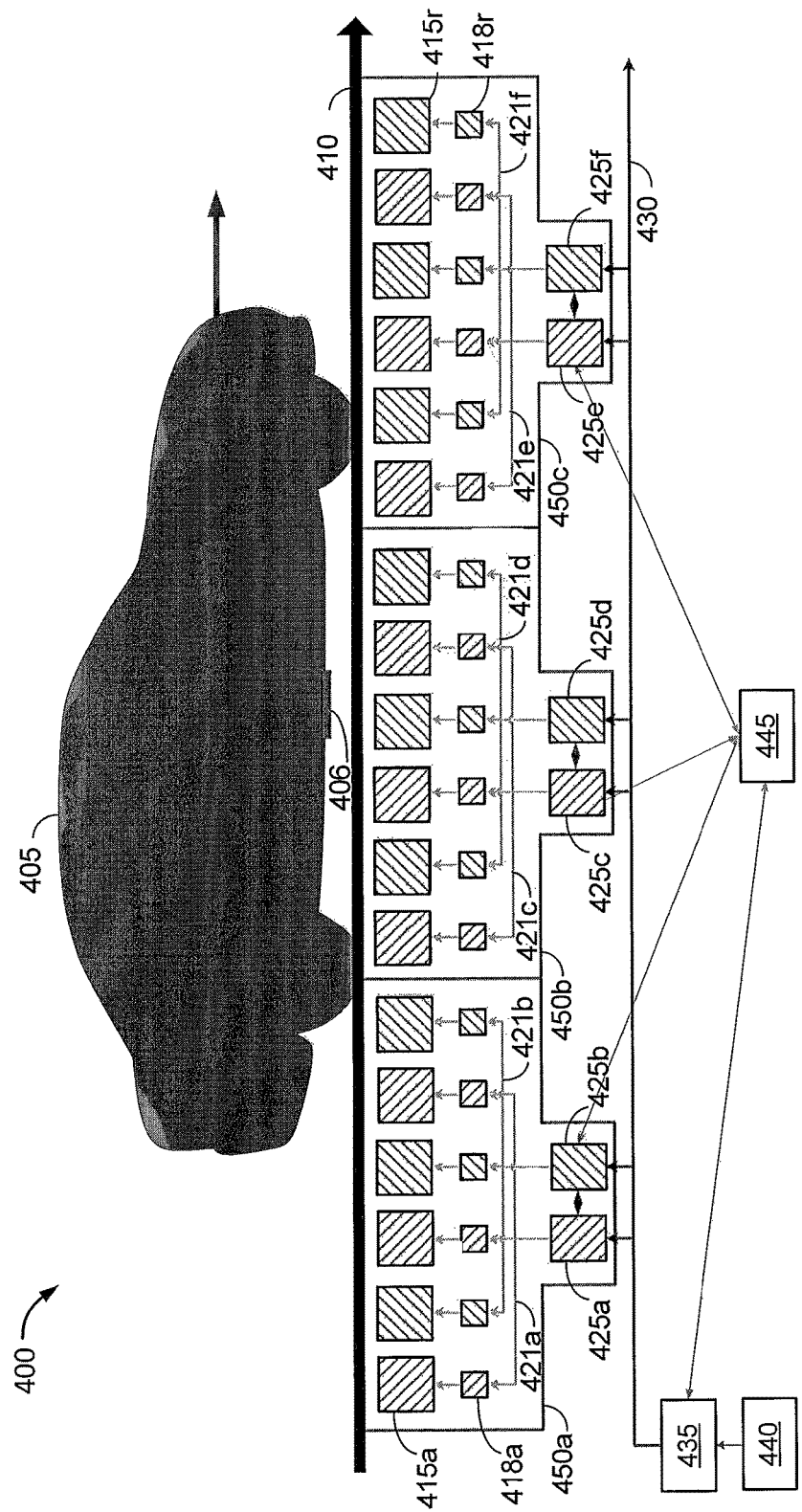
FIG. 4 illustrates a functional block diagram of an electric vehicle with at least one vehicle coupler in the presence of a wireless charging power transfer system, in accordance with some implementations.

FIG. 4 illustrates a functional block diagram of an electric vehicle 405 with at least one vehicle coupler 406 in the presence of a wireless charging power transfer system 400, in accordance with an implementation. As shown in FIG. 4, various components of a distribution network of a wireless charging power transfer system 400 are installed beneath, along or beside a roadway 410. The roadway 410 extends from the left side of FIG. 4 to the right side of FIG. 4, with a direction of travel of the electric vehicle 405 aligned with the roadway 410. The electric vehicle 405 may comprise at least one vehicle coupler 406, similar to the receivers 108/208, as previously described in connection with FIGS. 1 and 2, respectively. In some implementations, the at least one vehicle coupler 406 may comprise a polarized coupling system (e.g., a double-D coupler), a quadrature coupler system, combined double-D quadrature coupler system, or any other system utilizing any other type or shape of coupler (e.g., circular, rectangular, or solenoid shaped couplers). A vehicle coupler 406 (secondary coil) may couple with the magnetic field emitted by the primary coil to receive flux. In some implementations, the vehicle coupler 406 (secondary coil) may be selected to compliment the primary coil(s) so as to couple with as much of the magnetic field to maximize the received flux. If the primary coil is producing polarized (e.g., horizontal) flux, then a polarized type of vehicle coupler 406 may be used in the coupling system (e.g., a double-D coil or a solenoid); alternatively, if the primary coil is producing vertical flux, then a circular coil or a quadrature coil may be used. If the primary coil is producing a combination of horizontal and vertical flux, then a combination vehicle coupler may be used, e.g., a DDQ coil. The "double-D" may refer to placing two D-shaped coils back to back such that the overall shape of the coil is round. A quadrature coil may use four coils as opposed to only two, in various geometries.

The dynamic wireless charging system 400 may comprise a plurality of base couplers 415a-415r installed in, on, beside, or flush with the roadway 410. Each of the plurality of base couplers 415a-415r may be configured to generate a wireless field (see the wireless field 205 of FIG. 2) for wirelessly transferring power to the electric vehicle 405 via the at least one vehicle coupler 406 when activated. Each of a plurality of switches 418a-418r may be configured to operationally connect a respective one of the base couplers 415a-415r to one of a plurality of local controllers 425a-425f via one of a plurality of distribution circuits 421a-421f. The local controllers 425a-425f may be configured to wirelessly receive power from a power supply/inverter 435, via an alternating current (AC) power backbone 430, and control an amount of power transferred to one or more of the plurality of base couplers 415a-415f via the switches 418a-418r. The power supply/inverter 435 may receive its power from a power source 440. The power source 440 and/or the power supply/inverter 435 may be sized based on a number of base couplers 415 to power, a number of local controllers 425, and/or a number and type of electric vehicles 405 to be charged. The power source 440 and power supply/inverter 435 may provide current at a frequency utilized by the base couplers 415 or, alternatively, at some higher or lower frequency. The AC power backbone 430 may comprise a loop conductor that distributes the high frequency (HF) power and may be capable of synchronizing the base couplers 415 and/or the local controllers 425 that are near each other to a single phase. Thus, the AC power backbone 430 may be considered a phase reference that also distributes power.

A distribution controller 445 may be in communication with the power supply/inverter 435 and the local controllers 425a-425f and may be configured to provide global coordination of power control between the local controllers 425a-425f. Groups of the base couplers 415, the switches 418, and the local controllers 425 may comprise a series of individual Base Array Network (BAN) modules 450a-450c. The respective components of the BAN modules 450 are shaded to indicate respective common current paths.

As the electric vehicle 405 travels along the roadway 410, the distribution controller 445 may communicate with one or more of the electric vehicle 405, the power supply/inverter 435, and the local controllers 425a-425f to coordinate activation or deactivation of particular ones of the base couplers 415a-r. For example, the distribution controller 445 may command the power supply/inverter 435 to generate a current and distribute the current to the AC power backbone 430. The AC power backbone 430 may utilize the distributed current to wirelessly supply power to the local controllers 425a-425f via a "double couple transformer."

The local controllers 425a-425f may receive the power from the AC power backbone 430 and provide a regulated amount of current to one or more of the base couplers 415a-r. In some implementations, the local controllers 425 in each BAN module 450 may comprise individual control units capable of independent control from each other. Alternatively, the local controllers 425 of each BAN module 450 may comprise a single, shared control unit or processor. The base couplers 415a-415r may generate wireless fields according to the current received via the respective switch 418a-418r from the local controller 425a-425f and may couple to the at least one vehicle coupler 406 to wirelessly transfer power to the electric vehicle 405.

Depending on the particular implementation, control of activation of the base couplers 415 may be shared to differing degrees between the distribution controller 445 and the local controllers 425a-425f. For example, in some implementations, the distribution controller 445 may coordinate the activation and deactivation of the base couplers 415a-415r and may coordinate any communications or actions between multiple BAN modules 450a-450c. In some other implementations, the distribution controller 445 may simply coordinate communications between the BAN modules 450a-450c or local controllers 425a-425f, while the local controllers 425a-425f may control the base coupler sequencing. In yet other implementations, the distribution controller 445 may activate a particular BAN module 450a-450c, but leave timing of the base coupler activations to the associate local controller(s) 425a-425f. In yet other implementations, the distribution controller 445 may communicate only non-critical information to the local controllers 425a-425f and not provide base coupler activation information.

Higher level coordination by the distribution controller 445, combined with the more localized current distribution and regulation at the local controllers 425a-425f may create a more responsive dynamic wireless charging system 400 with decentralized control via the local controllers 425a-425f. This may allow the local controllers 425a-425f to control current flow independently of the distribution controller 445 and allow local control of impedance matching and reactive voltage/amperage (VAr) loading. Such localized control may provide a decreased VAr load compensation response time since instructions need only come from the local controller 425a-425f and not from the distribution controller 445.

The distribution controller 445 may also obtain information regarding the velocity of the electric vehicle 405 for controlling activation of particular ones of the base couplers 415a-415r. The distribution controller 445 may obtain this information from the electric vehicle 405 or from various sensors or load analysis of the base couplers 415a-415r. In other implementations, each of the BAN modules 450a-450c may sense the presence of the electric vehicle 405 and autonomously and selectively activate the appropriate base couplers 415a-415r according to a detected presence or location of the electric vehicle 405. In yet other implementations, the BAN modules 450a-450c may receive a signal comprising information regarding the electric vehicle 405 velocity and/or position or an activation command from a neighboring BAN module. The received signal may come directly from the neighboring BAN module (e.g., a corresponding local controller 425) or via the distribution controller 445.

When a respective local controller 425 receives a signal from the distribution controller 445 to activate a specific base coupler 415, the respective local controller 425 may activate the switch 418 corresponding to the specific base coupler 415. As the vehicle 405 continues in the direction of travel, the local controllers 425a-425f may receive commands from the distribution controller 445 to activate or deactivate specific base couplers 415a-415r based on the position of the vehicle coupler 406. The local controllers 425a-425f may further control or regulate the current from the AC power backbone 430.

As depicted, the base couplers 415 from consecutive local controllers 425 may be interleaved or interlaced such that a single local controller 425 may provide power to alternating base couplers 415. Thus, the base couplers 415 from a first local controller 425 may be proximally interleaved with the base couplers 415 controlled by a second local controller 425 when the two local controllers 425 are within the same BAN module 450. Thus, alternating base couplers 415 may be powered by different local controllers 425 and one local controller need not simultaneously power two adjacent base couplers 415. Additionally, preventing a single local controller 425 from providing current to consecutive or adjacent base couplers 415 may reduce power rating requirements of individual components, as each component need only be capable of handling the current load of a single base coupler 415 at a given time.

A wireless charging power transfer system having unbalanced reactive power loading may be able to transfer less power than a system having a balanced reactive power loading between the power source (e.g. the AC power backbone 430) and the load, or receiver (e.g., the base couplers 415). For example, unbalanced reactive power may result in thermal losses, voltage differences between the source and sink, and a decrease in voltage stability, among other factors. Accordingly, in some implementations, the local controllers 425a-425f may each comprise a tuning circuit or network to tune the current, and consequently the power, available to currently activated base coupler(s) 415. Such tuning circuits may allow for maintaining an optimum, or balanced VAr of the wireless charging system 400 within a small range (e.g., +/−5%) of the designed power tuning value.

In order to provide such a wireless charging power transfer system for an extended distance within or on a roadway, repeatable and reliable replication of removable, replaceable, or interchangeable holders may be desirable within the wireless charging power transfer system. In some implementations, a modular coil holder may be laid out in an extended (e.g., infinite) fashion, as will be described in connection with FIG. 5.

Figure 5:
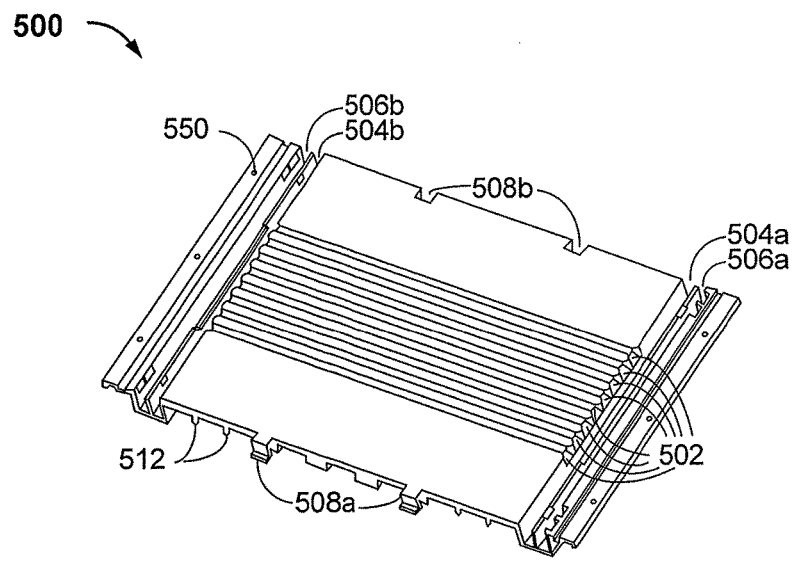
FIG. 5 illustrates a modular coil holder for a wireless charging power transfer system, in accordance with some implementations.

FIG. 5 illustrates a modular coil holder 500 for a wireless charging power transfer system, in accordance with some implementations. As shown in FIG. 5, the modular coil holder 500 may include a first surface comprising a plurality of grooves 502 for supporting or holding at least a portion of a conductor of a primary coupler (e.g., conductor wire of one or more primary coils of the wireless charging power transfer system). In some implementations, the plurality of grooves 502 may be parallel to one another. In some implementations, the plurality of grooves 502 may be equally spaced from one another. The holder 500 comprises a first plurality of transverse grooves (e.g., transverse grooves 504a and 506a) abutting a first end of the plurality of grooves 502 and a second plurality of transverse grooves (e.g., grooves 504b/506b) abutting a second end (opposite the first end) of the plurality of grooves 502. In some implementations, the first plurality of transverse grooves 504a/506a may extend parallel to one another, and the second plurality of transverse grooves 504b/506b may extend parallel to one another. In some implementations, the first 504a/506a and the second 504b/506b plurality of transverse grooves may extend in a direction that is substantially perpendicular to a direction of extension of the plurality of grooves 502. In this way, the first and second pluralities of transverse grooves 504a/506a 504b/506b, respectively, may be configured to hold or guide conductors or wires of one or more coils as they extend from the holder 500 to an adjacent holder (not shown in FIG. 5). Likewise, the plurality of grooves 502 may be configured to hold the conductors or wires of one or more of the coils that are routed from one of the first plurality of transverse grooves 504a/506a to one of the second plurality of transverse grooves 504b/506b.

The holder 500 may also comprise one or more mechanical connectors 508a on a first side of the holder 500, and one or more mechanical connectors 508b on a second side of the holder 500 opposite the first side. The mechanical connectors 508a on the first side of the holder 500 may be configured to mechanically connect or fasten to the mechanical connectors 508b on the second side of an adjacent holder (not shown in FIG. 5) and vice versa. In this way, a plurality of holders (e.g., the holders 500) may be mechanically and linearly connected to one another along a roadway to provide a base array network of wireless power transfer coils.

In some implementations, the holder 500 may additionally comprise a plurality of guides 512 on a second surface of the holder 500 opposite the first surface. The guides 512 are configured to hold or guide a ferrimagnetic structure (e.g., a plurality of ferrite blocks, tiles, strips, sheets, plates or otherwise structures are held by the guides 512) disposed under, over, or on the holder 500. In some implementations, the guides 12 may comprise, or form at least a portion of, "means for holding a ferrimagnetic structure on a second surface of the holder opposite a first surface." For example, in a non-limiting example, the guides 512 on a bottom surface of the holder 500 may be configured to align a plurality of ferrite strips (not shown in FIG. 5) adjacent to, under or on the holder 500. The holder 500 may additionally include a plurality of mounting holes or fasteners 550 for mounting the holder 500 to a former.

By routing, guiding or holding conductors of one or more coils within the plurality of grooves 502 and within the first 504a/506a and/or second 504b/506b plurality of transverse grooves in each of a plurality of holders 500, standardized and uniform dimensions of, and distances between, coils within the roadway may be easily achieved. Additionally, the guides 512 may allow for accurate and repeatable ferrite structure placement. Such holders 500 may be mass produced for a reasonable cost. Since the holder 500 is modular, an additional benefit is relatively inexpensive maintenance and replacement of defective, worn or old elements of the wireless charging power transfer system.

Figure 6:
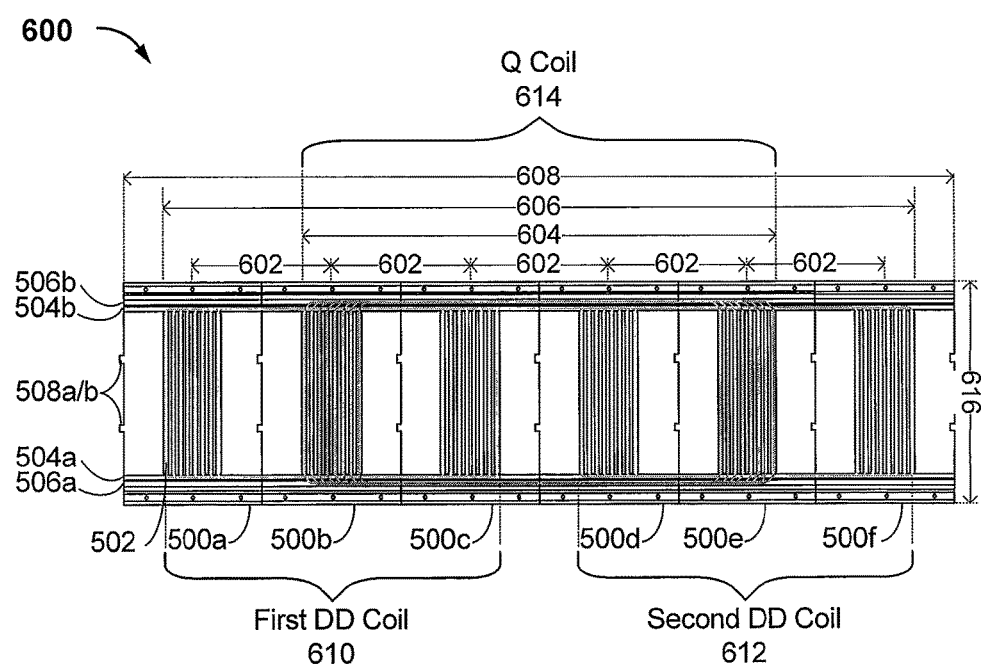
FIG. 6 illustrates a plurality of the modular holders of FIG. 5, in accordance with some implementations.

FIG. 6 illustrates a plurality 600 of modular holders 500a-500f of FIG. 5, in accordance with some implementations. As shown in FIG. 6, a plurality of holders 500a-500f may be interconnected with one another by the mechanical connectors 508a/508b on each holder, as previously described in connection with FIG. 5. In some implementations, a BAN (e.g., the BAN modules 450a-450c of FIG. 4) may comprise a plurality (e.g., 6) of holders 500a-500f. However, the present application is not so limited and any number of holders may form a particular BAN, and any number of BANs may be linearly interconnected to one another. As shown, because the modular holders 500a-500f have the same dimensions, a uniform potential center-to-center distance 602 (e.g., 291.6 mm) between adjacent coils may be achieved.

FIG. 6 shows a DDQ coil arrangement for purposes of illustration and not limitation. Such a DDQ coil arrangement comprises a first double "D" (DD) coil 610, a second DD coil 612 disposed adjacent to the first DD coil 610, and a quadrature (Q) coil 614 overlapping the first and second DD coils 610/612. As shown in FIG. 6, conductors of the first DD coil 610 may be disposed in and guided by the plurality of grooves 502 in the first holder 500a, along the transverse grooves 504a/504b of each of the first 500a, second 500b and third 500c holders, and guided by the plurality of grooves 502 in the third holder 500c. Likewise, conductors of the second DD coil 612 may be disposed in and guided by the plurality of grooves in the fourth holder 500d, along the transverse grooves 504a/504b in the fourth 500d, fifth 500e and sixth 500f holders, and guided by the plurality of grooves 502 in the sixth holder 500f. Similarly, conductors of the Q coil 614 may be disposed in and guided by the plurality of grooves 502 in the second holder 500b, along the transverse grooves 506a/506b in the second 500b, third 500c, fourth 500d, and fifth 500e holders, and guided by the plurality of grooves 502 in the fifth holder 500e. Accordingly, in some implementations, the one or more grooves 502 in the first surface provide a same center-to-center spacing between the coil (e.g., the Q coil 614) and adjacent coils (e.g., the first DD coil 610 and the second DD coil 612) when the holder (e.g., the holder 500a) is fastened to the at least one other holder (e.g., one or more of the holders 500b-500f). Accordingly, by utilizing the modular holders 500a-500f, a predetermined uniform Q coil dimension 604, a uniform overall DD coils or total magnetics dimension 606 (e.g., 1710 mm), and a uniform overall BAN dimension 608 (e.g., 1750 mm) may be achieved. In some implementations, a uniform BAN width 616 (e.g., 412 mm) and a uniform BAN depth (e.g., 34 mm) (not shown) may also be achieved. Although not shown in FIG. 6, ferrite strips, tiles, bars, sheets, plates or other ferrite structures may be disposed under, over, or adjacent to the holders 500a-500f in positions based on the guides 512 on the second (e.g., bottom) surfaces of the holders 500a-500f, as previously described in connection with FIG. 5. In some implementations, components for the AC power backbone 430, the double-couple transformer, or any other component for the wireless charging power transfer system, as previously described in connection with FIG. 4, may also be included in, on, or adjacent to one or more of the holders 500a-500f. In some implementations, a sealant (e.g., epoxy, silicone or any other waterproof sealing material) may be disposed over the conductors of one or more of the first DD coil 601, the second DD coil 612, and the Q coil 614. For example, the sealant may be disposed in the plurality of grooves 502 and/or in the transverse grooves 504a, 504b, 506a, 506b of one or more of the holders 500a-500f such that the sealant provides a moisture-tight seal that protects the coils from exposure to moisture. In some other implementations, the sealant may be disposed over the entire surface of the holders 500a-500f or any proportion of the surface of the holders 500a-500f.

Figure 7:
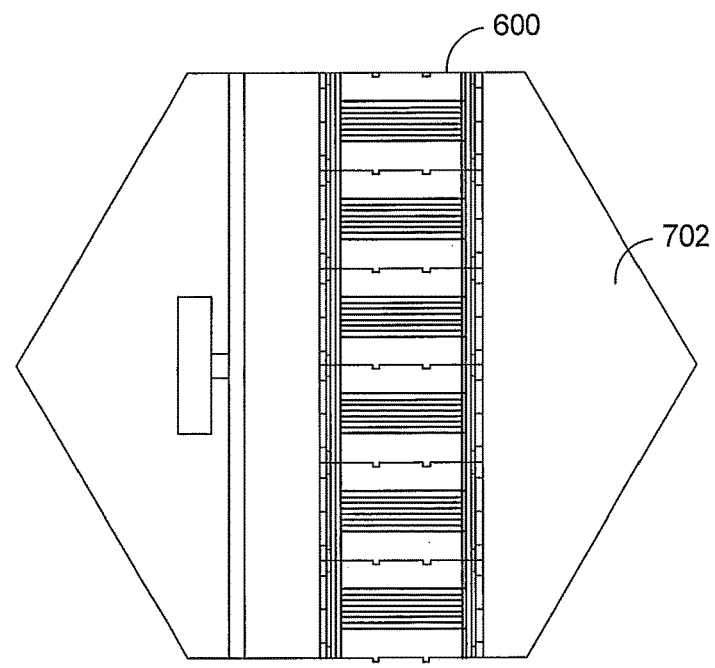
FIG. 7 illustrates the plurality of modular holders of FIG. 6 mounted to a former, in accordance with some implementations.

In some implementations, the plurality 600 of modular holders 500a-500f may be mounted to or on a former (e.g., a concrete former), as will be described in connection with FIG. 7. FIG. 7 illustrates the plurality of modular holders 600 of FIG. 6 mounted to a former 702, in accordance with some implementations. The plurality 600 of modular holders, as previously shown in FIG. 6, are mounted to a concrete former 702. In some implementations, the former 702 may have a substantially hexagonal shape. In some other implementations, the former 702 may have a substantially rectangular, square or other shape sufficient in dimension to provide for mounting of at least the plurality 600 of modular holders. In some implementations, each BAN (e.g., the BAN modules 450a-450c of FIG. 4) may comprise the former 702 and the appropriate number of modular holders 600. The former 702 may be described in more detail in connection with FIG. 8.

Figure 8:
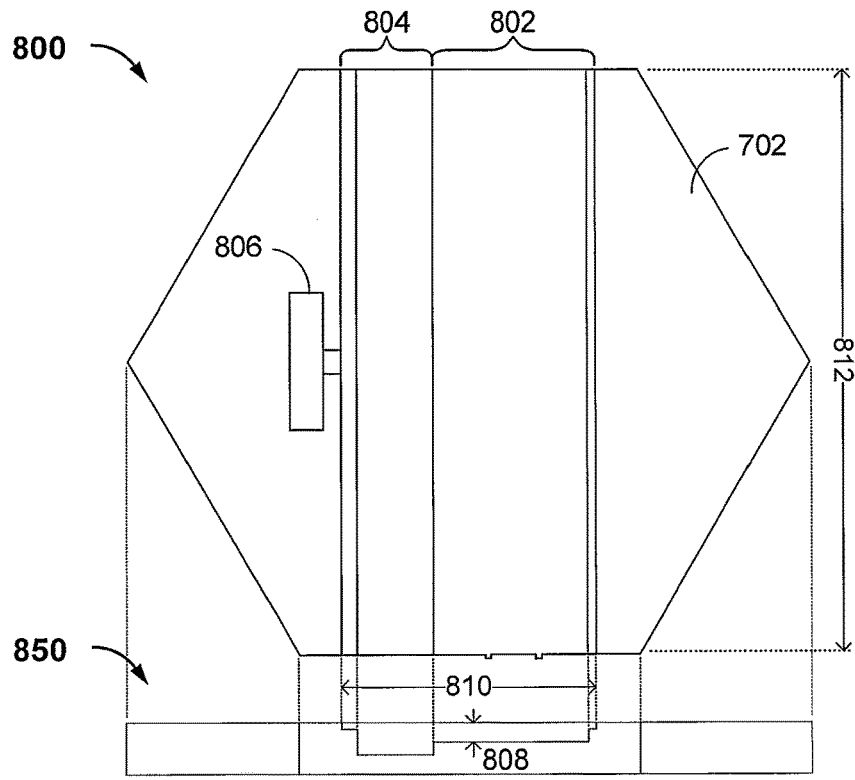
FIG. 8 illustrates top and side views of the former of FIG. 7, in accordance with some implementations.

FIG. 8 illustrates top 800 and side 850 views of the former 702 of FIG. 7, in accordance with some implementations. As shown in the top view 800 of FIG. 8, the former 702 may include a first recessed portion 802 and a second recessed portion 804. The first recessed portion 802 may provide a space for mounting of the plurality of holders 600 as previously described in connection with FIGS. 6 and 7. The second recessed portion 804 may provide a space for mounting additional components or elements of the wireless charging power transfer system, either to one or more of the plurality of holders 600, or directly to the former 702. For example, as previously described in connection with FIG. 6, the second recessed portion 804 may provide space for mounting, adjacent to the plurality of holders 600, the AC power backbone 430, one or more double couple transformers, or any other components of the wireless charging power transfer system of FIG. 4. In some implementations where both the first and second recessed portions 802 and 804 are present, the first and second recessed portions 802 and 804 may have a combined width 810 (e.g., 685 mm), and a length 812 of substantially the same length as the plurality of holders 600 (e.g., 1750 mm). In some implementations, where power electronics are not mounted to the holders 600 the former 702 may additionally include a third recessed portion 806 for mounting the power electronics associated with the wireless charging power transfer system.

As shown in the side view 850 of FIG. 8, each of the first and second recessed portions 802/804 may have different depths. For example, the first recessed portion 802 may have an exemplary and non-limiting recess depth of approximately 80 mm, although other depths may be utilized based on the particular implementation. The second recessed portion 804 may have a deeper, shallower, or same depth recess as the first recessed portion 802 based on the particular implementation and what elements or components are disposed therein. In some implementations, each of the first and second recessed portions 802/804 may have a reduced depth at the edge of the recesses to provide an appropriate depth for flush mounting the plurality of holders 600 and/or other components or elements of the wireless charging system, which may be more apparent as shown in FIG. 9.

Figure 9:
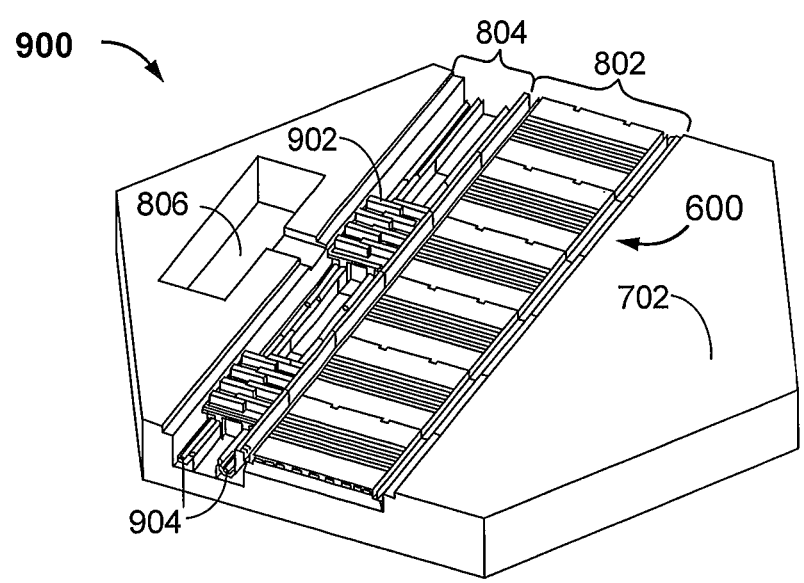
FIG. 9 illustrates an isometric view of the plurality of modular holders of FIG. 6 and additional components mounted to the former of FIG. 7, in accordance with some implementations.

FIG. 9 illustrates an isometric view 900 of the plurality of modular holders 600 of FIG. 6 and additional components 902/904 mounted to the former 702 of FIG. 7, in accordance with some implementations. As shown in FIG. 9, the former 702 may comprise the first 802, second 804 and third 806 recessed portions, as previously described in connection with FIG. 8. Components of the wireless charging power transfer system may be mounted or disposed in the second recessed portion 804, for example. Examples of such components may comprise an AC power backbone conductor 904, analogous to the AC power backbone 430 of FIG. 4, the double couple transformer 902 analogous to that previously described in connection with FIG. 4, or any other wireless power transfer components. The plurality of holders 600 previously described in connection with FIG. 6 may also be mounted to the former 702 in the first recessed portion 802. In some implementations, the second recessed portion 804 may not be present or may be merged with or as part of the first recessed portion 802.

Figure 10:
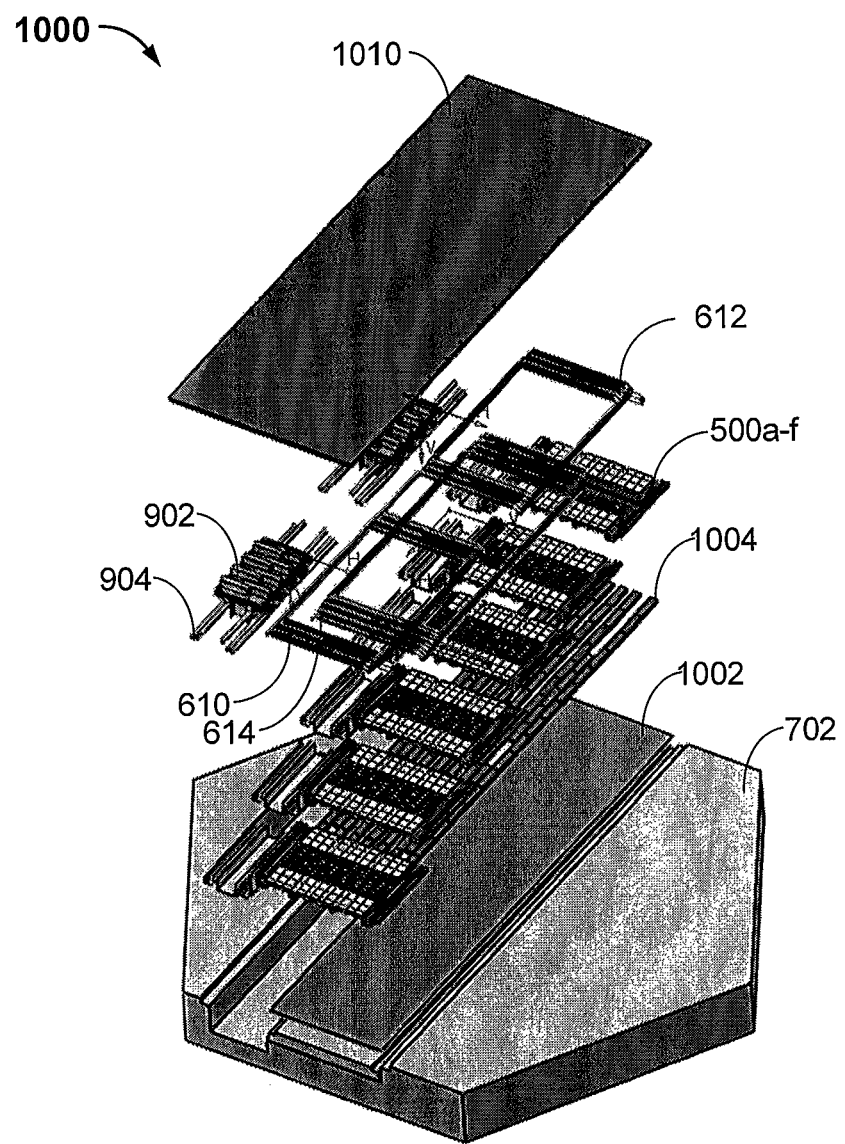
FIG. 10 illustrates an exploded isometric view of the plurality of modular holders of FIG. 6 and additional components mounted to the former of FIG. 7, in accordance with some implementations.

FIG. 10 illustrates an exploded isometric view 1000 of the plurality of modular holders 600 of FIG. 6 and additional components mounted to the former 702 of FIG. 7, in accordance with some implementations. As shown in FIG. 10, an aluminum plate 1002 may be mounted to the bottom of at least the first recessed portion 802. In some implementations, the aluminum plate 1002 may have substantially the same dimensions as the first recessed portion 802. A ferrite structure 1004 may be disposed over the aluminum plate 1002. In some implementations, the ferrite structure 1004 may comprise a plurality of ferrite strips, tiles, plates or the like. In some implementations, the ferrite structure 1004 may be placed on (e.g., attached to) a bottom side of each of the plurality of holders 500a-500f according to the guides 512 (not shown in FIG. 10), as previously described in connection with FIG. 5. The plurality of holders 500a-500f may be mounted over the ferrite structure 1004 and the aluminum plate 1002. The first DD coil 610, the second DD coil 612, and the Q coil 614 may be disposed in the grooves of the corresponding holders 500a-500f, as previously described in connection with FIG. 6. The components of the wireless charging power transfer system, for example and not limitation the AC power backbone conductor 904 and the double couple transformers 902, may be mounted within the second recessed portion of the former 702, and may, in some implementations, be mechanically connected to the holders 500a-500f. In some implementations, a cover 1010 may be disposed over the first and second recessed portions in order to provide a shield from weather for the above-mentioned components mounted to or on the former 702. In this way, by placing and connecting a plurality of formers adjacent to one another, each as described above, a wireless charging power transfer system may be realized that may extend for an arbitrary distance and that may be maintained by replacing individual modular formers, holders and/or components at a relatively low cost.

Figure 11:
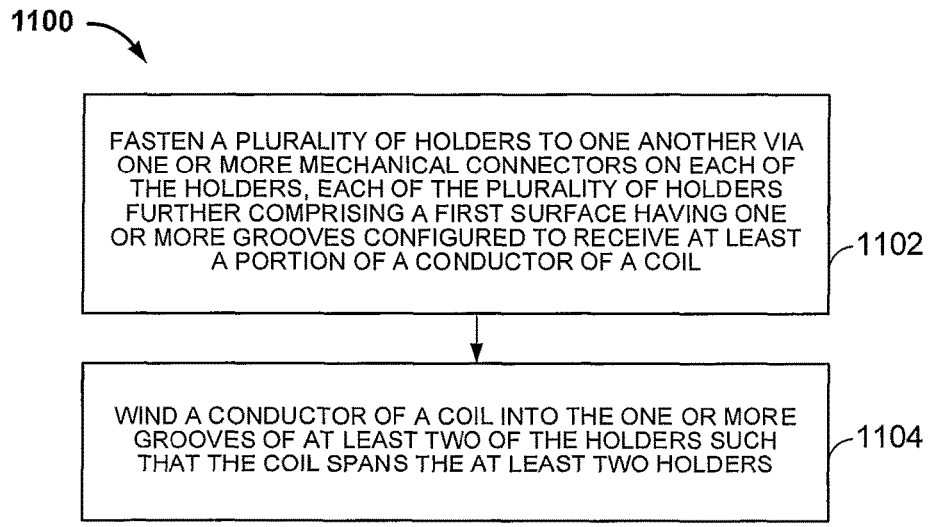
FIG. 11 is a flowchart depicting a method for installing a wireless charging power transfer system, in accordance with some implementations.

FIG. 11 is a flowchart 1100 depicting a method for installing a wireless charging power transfer system, in accordance with some implementations. The method of flowchart 1100 is described herein with reference to the wireless charging power transfer systems as previously described in connection with FIGS. 5-10. Although the method of flowchart 1100 is described herein with reference to a particular order, in various implementations, blocks herein may be performed in a different order, or omitted, and additional blocks may be added.

The flowchart 1100 may start with block 1102, which includes fastening a plurality of holders to one another via one or more mechanical connectors on each of the holders. Each of the plurality of holders further comprises a first surface having one or more grooves configured to receive at least a portion of a conductor of a coil. For example, each of the plurality of holders 500a-500f of FIG. 5 (e.g., 600 in FIG. 6) may comprise a first surface having one or more grooves 502 configured to support at least a portion of a conductor of a coil that is configured to inductively transfer power via a magnetic field, and one or more mechanical connectors 508a/508b configured to connect the holder 500 to one or more other holders. The flowchart 1100 may then advance to block 1104.

Block 1104 includes winding a conductor of a coil into the one or more grooves of at least two of the holders such that the coil spans the at least two holders. For example, as shown in FIG. 6, one or more of the first DD coil 610, the second DD coil 612, and the Q coil 614 may be wound into the grooves 502 of at least two of the plurality of holders 500a-500f. As shown, each of the first DD coil 610, the second DD coil 612, and the Q coil 614 span at least two of the holders 500a-500f.

In some implementations, the method may further comprise winding the conductor into a plurality of transverse grooves (e.g., transverse grooves 504a/b and/or 506a/b) that extend in a direction substantially perpendicular to a direction of extension of the one or more grooves (e.g., the grooves 502) to guide the conductor from one holder to an adjacent holder. The method may further comprise fastening a ferrimagnetic structure (e.g., ferrimagnetic structure 1004) to a second surface of each of the plurality of holders (e.g., the holders 500a-500f) utilizing a plurality of guides (e.g., the guides 512) on the second surface of each of the holders, wherein the second surface is opposite the first surface. Furthermore, the method may comprise attaching, to the holder, one or more components for transferring power (e.g., the additional components 902/904, which may include an AC power backbone conductor 904 and/or a double couple transformer 902) from a power supply to the coil. Thus, in some implementations, the holder may additionally comprise, or form at least a portion of "means for supporting one or more components for transferring power from a power supply to the coil." The method may further comprise providing a former (e.g., the former 702) having a recessed portion (e.g., one or more of the recessed portions 802, 804 and 806) and placing each of the plurality of holders in the recessed portion. The method may further comprise placing an aluminum plate (e.g., the aluminum plate 1002) in the recessed portion, between the former and the plurality of holders.

Figure 12:
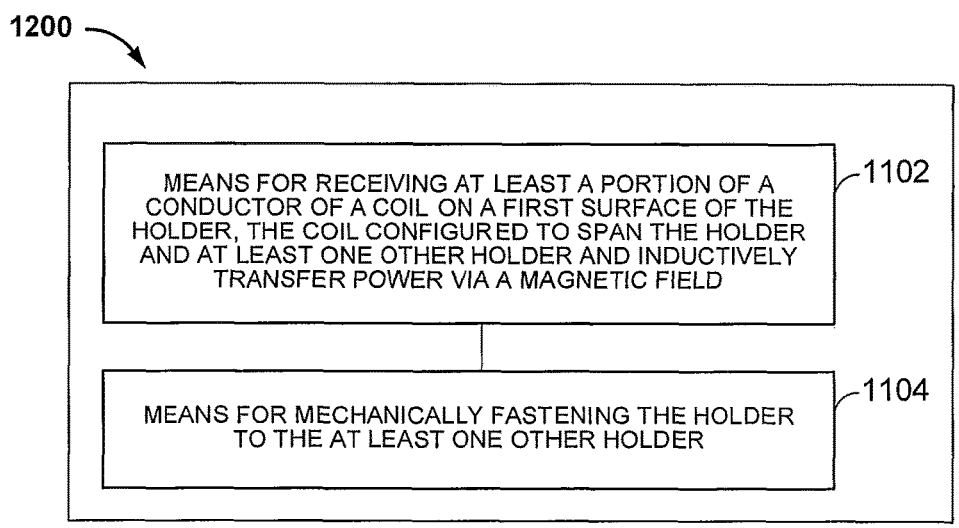
FIG. 12 is a functional block diagram of a holder configured to hold one or more components of a wireless charging power transfer system, in accordance with some implementations.

FIG. 12 is a functional block diagram of holder 1200 configured to hold one or more components of a wireless charging power transfer system, in accordance with some implementations. The apparatus 1200 comprises means 1202 and means 1204 for the various actions previously discussed with respect to FIGS. 5-11. The apparatus 1200 includes means 1202 for receiving at least a portion of a conductor of a coil on a first surface of the holder, the coil configured to span the holder and at least one other holder and inductively transfer power via a magnetic field. In various implementations, the means 1202 may be implemented by the one or more of the grooves 502 of the holder 500, as described in connection with FIG. 5.

The apparatus 1200 further includes means 1204 mechanically fastening the holder to the at least one other holder. In various implementations, the means 1204 may be implemented by the mechanical connectors 508a/508b, as previously described in connection with FIG. 5.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. A holder configured to hold one or more components of a wireless charging power transfer system, the holder comprising:
    a first surface having one or more grooves that extend along at least a portion of the first surface in a first direction and being positioned at a first location, the one or more grooves configured to receive at least a portion of a conductor of a coil that extends along at least a portion of the first surface and at least a portion of at least one other first surface of at least one other holder, the coil configured to inductively transfer power via a magnetic field;
    a second surface having a plurality of guides configured to hold a ferrimagnetic structure, the second surface positioned at a second location opposite the first surface; and
    one or more mechanical connectors configured to fasten the holder to at least one other holder,
    wherein the plurality of guides holds the ferrimagnetic structure onto the second surface and a second surface of the at least one other holder and wherein the plurality of guides aligns the ferrimagnetic structure along at least a portion of the second surface and at least a portion of the second surface of the at least one other holder in a second direction different from the first direction.

2. The holder of claim 1, further comprising a plurality of transverse grooves on the first surface that extend in a direction substantially perpendicular to a direction of extension of the one or more grooves, the plurality of transverse grooves configured to guide the conductor of the coil from the one or more grooves of the holder to one or more grooves of the at least one other holder.

3. The holder of claim 1, wherein the one or more grooves in the first surface provide a same center-to-center spacing between the coil and adjacent coils when the holder is fastened to the at least one other holder.

4. The holder of claim 1, further comprising the ferrimagnetic structure held by the plurality of guides on the second surface.

5. The holder of claim 1, further configured to support one or more components for transferring power from a power supply to the coil.

6. The holder of claim 1, wherein the holder is disposed in a recessed portion of a former, the recessed portion configured to support the holder.

7. A holder configured to hold one or more components of a wireless charging power transfer system, the holder comprising:
    a first surface having one or more grooves that extend along at least a portion of the first surface in a first direction and being positioned at a first location, the one or more grooves configured to receive at least a portion of a conductor of a coil, the coil configured to inductively transfer power via a magnetic field;
    a second surface having a plurality of guides configured to hold a ferrimagnetic structure, the second surface positioned at a second location opposite the first surface; and
    one or more mechanical connectors configured to fasten the holder to at least one other holder, wherein the holder is further configured to support one or more components for transferring power from a power supply to the coil,
    wherein the plurality of guides holds the ferrimagnetic structure onto the second surface and a second surface of the at least one other holder and wherein the plurality of guides aligns the ferrimagnetic structure along at least a portion of the second surface and at least a portion of the second surface of the at least one other holder in a second direction different from the first direction.

8. The holder of claim 7, further comprising a plurality of transverse grooves on the first surface that extend in a direction substantially perpendicular to a direction of extension of the one or more grooves, the plurality of transverse grooves configured to guide the conductor of the coil from the one or more grooves of the holder to one or more grooves of the at least one other holder.

9. The holder of claim 7, wherein the one or more grooves in the first surface provide a same center-to-center spacing between adjacent ones of the coil and a plurality of other coils when the holder is fastened to the at least one other holder.

10. The holder of claim 7, further comprising the ferrimagnetic structure held by the plurality of guides on the second surface.

11. The holder of claim 7, wherein the conductor of a coil spans the holder and the at least one other holder.

12. The holder of claim 7, wherein the holder is disposed in a recessed portion of a former, the recessed portion configured to support the holder.

13. A method for installing a wireless charging power transfer system, the method comprising:
fastening a plurality of holders to one another via one or more mechanical connectors on each of the holders, each of the plurality of holders further comprising:
a first surface having one or more grooves that extend along at least a portion of the first surface in a first direction and being positioned at a first location, the one or more grooves configured to receive at least a portion of a conductor of a coil, and
a second surface having a plurality of guides configured to hold a ferrimagnetic structure, the second surface positioned at a second location opposite the first surface, and
winding a conductor of the coil into the one or more grooves of at least two of the holders such that the coil spans the at least two holders,
wherein the plurality of guides holds the ferrimagnetic structure onto the second surface and a second surface of the at least one other holder and wherein the plurality of guides aligns the ferrimagnetic structure along at least a portion of the second surface and at least a portion of the second surface of the at least one other holder in a second direction different from the first direction.

14. The method of claim 13, further comprising winding the conductor into a plurality of transverse grooves that extend in a direction substantially perpendicular to a direction of extension of the one or more grooves to guide the conductor from the one or more grooves of one holder to the one or more grooves of an adjacent holder.

15. The method of claim 13, further comprising fastening a ferrimagnetic structure to the second surface.

16. The method of claim 13, wherein the one or more grooves in the first surface of each of the plurality of holders are configured to provide a same center-to-center spacing between the coil and an adjacent coil.

17. The method of claim 13, further comprising attaching to the holder one or more components for transferring power from a power supply to the coil.

18. The method of claim 13, further comprising:
providing a former having a recessed portion, and
placing each of the plurality of holders in the recessed portion.

19. The method of claim 18, further comprising placing an aluminum plate in the recessed portion, between the former and the plurality of holders.

20. A holder configured to hold one or more components of a wireless charging power transfer system, the holder comprising:
means for receiving at least a portion of a conductor of a coil on a first surface of the holder that extend along at least a portion of the means for receiving at least a portion of a conductor in a first direction and being positioned at a first location, the coil configured to span at least a portion of the first surface and at least one other first surface of at least one other holder and inductively transfer power via a magnetic field;
means for receiving a ferrimagnetic structure on a second surface having a second location opposite the first surface; and
means for mechanically fastening the holder to the at least one other holder,
wherein the means for receiving a ferrimagnetic structure holds the ferrimagnetic structure onto the second surface and a second surface of the at least one other holder and wherein the means for receiving a ferrimagnetic structure aligns the ferrimagnetic structure along at least a portion of the second surface and at least a portion of the second surface of the at least one other holder in a second direction different from the first direction.

21. The holder of claim 20, further comprising means for guiding the conductor of the coil from the holder to the at least one other holder on the first surface, wherein the means for guiding the conductor of the coil from the holder to the at least one other holder extends in a direction substantially perpendicular to a direction of extension of the means for receiving at least the portion of the conductor of the coil.

22. The holder of claim 20, wherein the means for receiving at least the portion of the conductor of the coil provide a same center-to-center spacing between adjacent ones of the coil and a plurality of other coils when the holder is fastened to the at least one other holder.

23. The holder of claim 20, further comprising the ferrimagnetic structure.

24. The holder of claim 20, further comprising means for supporting one or more components for transferring power from a power supply to the coil.

25. The holder of claim 20, wherein the holder is disposed in a recessed portion of a former, the recessed portion configured to support the holder.

26. The holder of claim 20, wherein the means for receiving at least the portion of the conductor of the coil comprises a plurality of grooves in the first surface of the holder.

27. The holder of claim 21, wherein the means for guiding the conductor of the coil from the holder to the at least one other holder comprise a plurality of transverse grooves in the first surface of the holder.

* * * * *